April 30, 1940.  W. H. SAID  2,198,741
METHOD AND APPARATUS FOR MAKING TUBING BLANKS
Filed Nov. 23, 1936   2 Sheets-Sheet 1
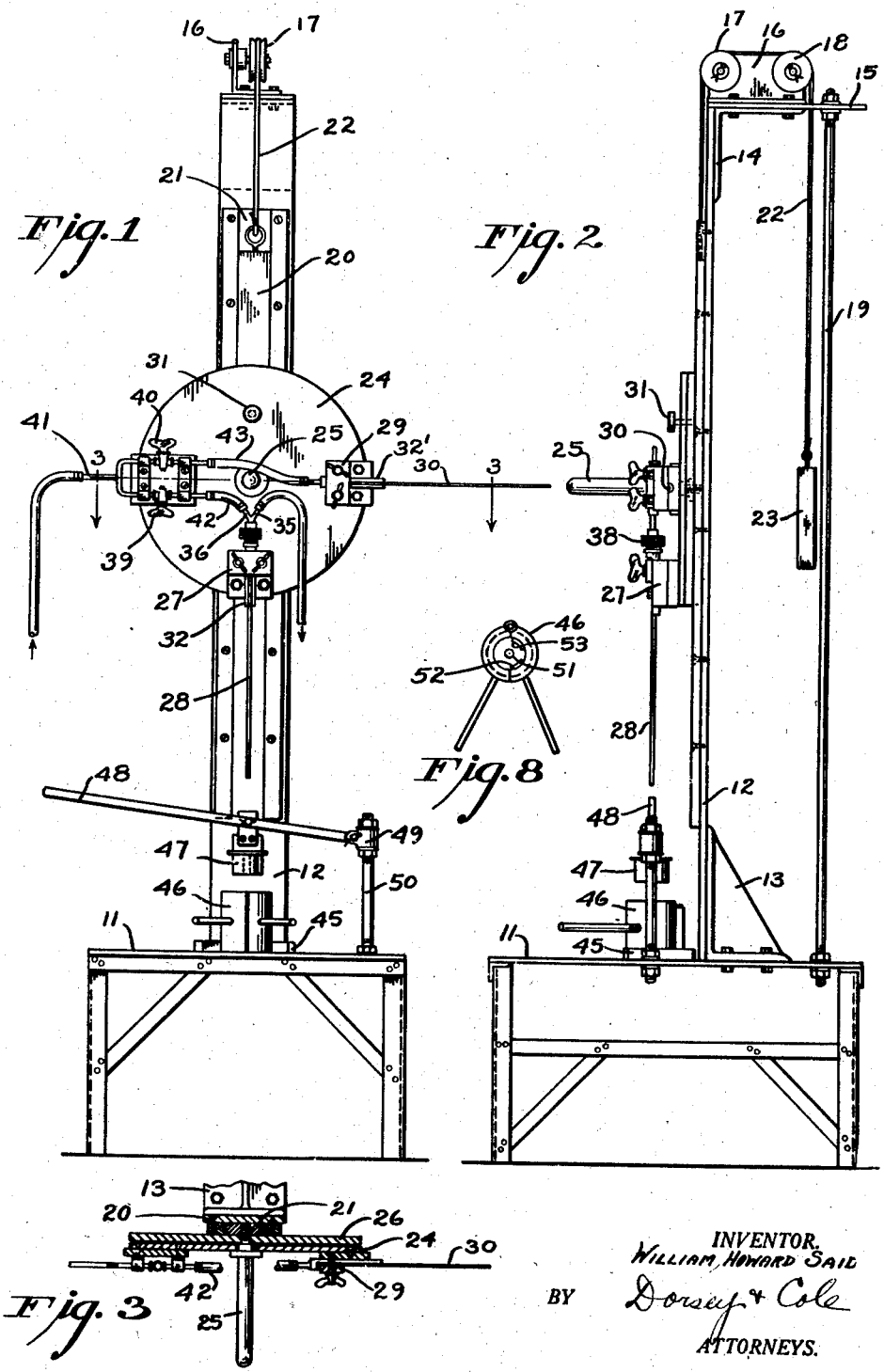
INVENTOR.
WILLIAM HOWARD SAID
BY Dorsey & Cole
ATTORNEYS.

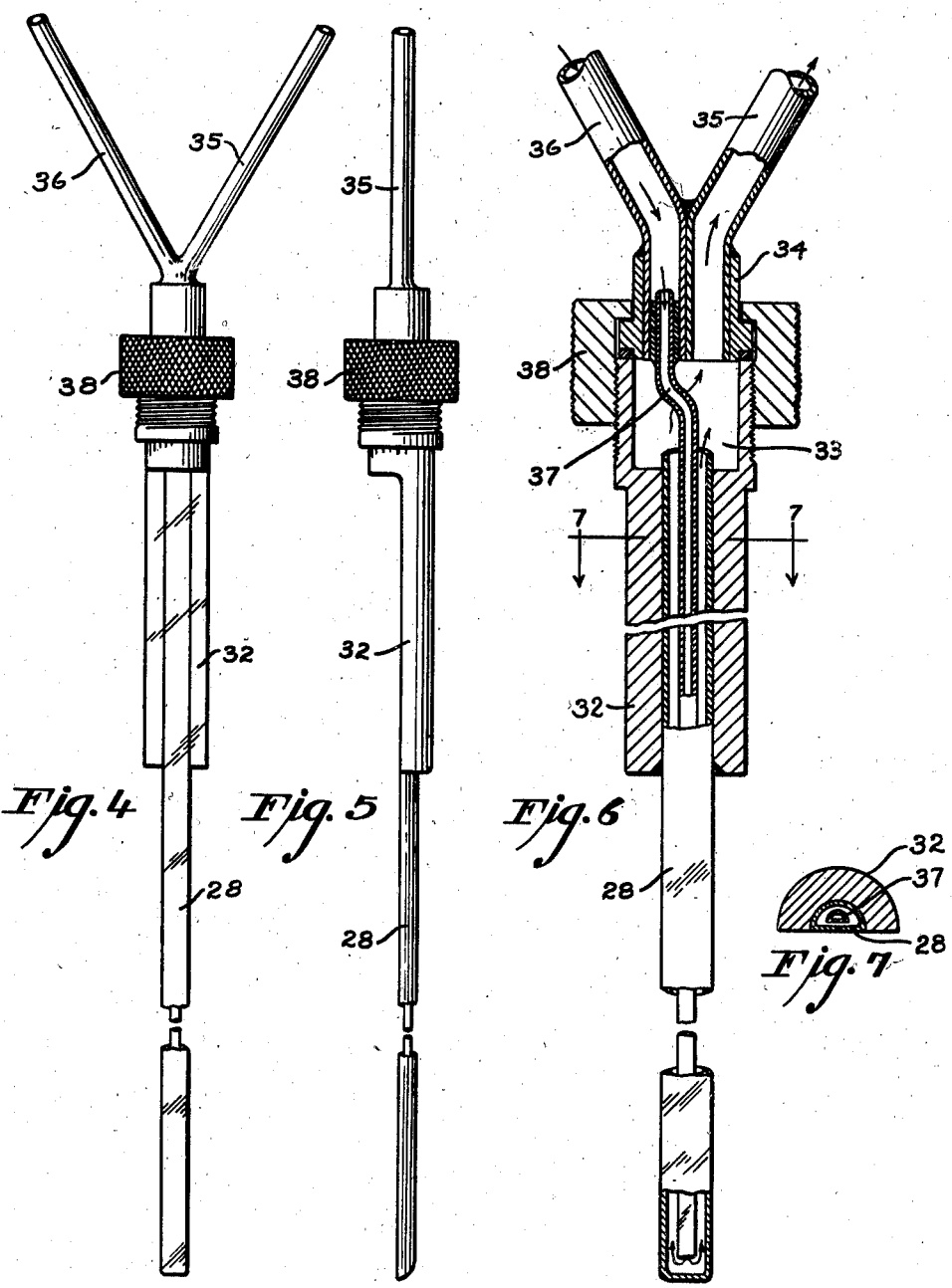

Patented Apr. 30, 1940

2,198,741

UNITED STATES PATENT OFFICE 2,198,741

METHOD AND APPARATUS FOR MAKING TUBING BLANKS

William Howard Said, Corning, N. Y., assignor to Corning Glass Works, Corning, N. Y., a corporation of New York Application November 23, 1936, Serial No. 112,399

5 Claims. (Cl. 49—31)

This invention relates to a method and apparatus for making blanks from which thermometer tubing and the like may be drawn, and may be considered as an improvement on the method and apparatus disclosed in Patent No. 1,749,016, granted to H. R. Boals, March 4, 1930.

The present method and apparatus has been developed for the purpose of producing tubing which will meet the more exacting requirements of forms of tubing such as disclosed in Patent No. 1,819,919, granted to C. R. Palmer et al., August 18, 1931. In the production of a tubing blank by use of an apparatus such as disclosed by Boals, special care must be exercised not to have the plunger in the mold too long as, in addition to danger of sticking of the plunger mentioned in the patent, there is also danger of oxidation forming thereon, which oxidation may remain in the blank bore. When the bore shape is round or oval, minor quantities of such foreign matter do no harm. In the production of a bore having such shapes as those disclosed by Palmer, however, it is highly important that no oxidation of the plunger occurs because the deposit of any foreign matter interferes with the free flow of the fluid contained in the bore of instruments fabricated from such tubing.

One object of this invention is the production of a tubing blank in which the bore is free of foreign matter.

Another object is the production of a tubing blank having a bore shape rendering it suitable for the production of tubing of the general type of that illustrated in the Palmer et al. patent, but which has advantages over those illustrated by Palmer et al. in that sharply restricted areas within the bore wherein foreign matter might adhere are avoided.

A further object is the production of a tubing blank wherein not only is the bore positively located with respect to the blank, but also a selected radial section of inner wall surface of the bore is definitely directed toward a definite perimetric portion of the outer wall of the blank.

A still further object of this invention is the production of tubing blanks with bores at least in part lined with glass of a contrasting characteristic.

This invention embodies among its features an assembly carrying two plungers adapted to be successively lowered into a mold containing a charge of molten glass, the first serving to form a preliminary bore therein and the second and more fragile of the two plungers serving to determine the final size of the bore.

Another feature includes the provision of an assembly wherein a plunger about to be introduced into the mold is positively so held that its rotary position with respect to the assembly is always the same, and also wherein the rotary position of the mold with respect to the assembly is always the same, thereby insuring that a selected inner wall surface of the bore produced will face in a direction toward a predetermined outer wall surface of the blank contained in the mold.

A further feature is the provision of a plunger having a flat wall surface joined to oppositely disposed edges of an arcuate wall surface so that the introduction of the plunger into a charge of plastic glass will produce a bore therein having an inner wall surface, a cross section of which takes the form of substantially a half circle and the remainder of which takes the form of a chord connecting the edges of such half circle, although other shapes of plungers may be employed.

Another feature includes the provision of plungers through which a cooling medium may be circulated while they remain in the mold to prevent their becoming over-heated to the point where oxidation or sticking of the glass thereto would be likely to occur.

A still further feature includes the provision of a compression block and associated facilities for forcing the charge of glass into intimate contact with the more fragile plunger as the wall of the preliminary formed bore becomes softened by the heat communicated to it by the surrounding glass in the mold.

A still further feature is the novel method of lining the wall of the bore with contrasting glass by the introduction of a strip of such glass into the mold alongside either of the plungers.

In the drawings:

Fig. 1 is a front elevational view of one form of apparatus embodying the invention;

Fig. 2 is a side elevation of Fig. 1;

Fig. 3 is a sectional view taken on line 3—3 of Fig. 1;

Figs. 4 and 5 are front and side elevational views of a primary bore forming plunger embodying the invention;

Fig. 6 is an enlarged view, similar to Fig. 4 but partly in section;

Fig. 7 is a sectional view taken on line 7—7 of Fig. 6; and

Fig. 8 is a plan view of the mold assembly used.

The apparatus illustrating the invention includes a suitable support or table 11 having a track assembly 12 mounted in a vertical position thereon by a suitable bracket 13. The other end of the track assembly 12 is secured to the vertical rim of an angle iron 14 (Fig. 2), the horizontal rim of which has a flat plate 15 mounted between it and an angle iron 16 supporting two pulleys 17 and 18. The track assembly 12 is made rigid with respect to the table by a rod 19 extending between the free end of plate 15 and the table.

A plunger support 20 (Figs. 1 and 3) is arranged for up and down movement in a dovetail channel 21 of the track assembly and is supported by a cable 22 passing over pulleys 17 and 18 and having a suitable counterweight 23 attached to the opposite end thereof.

The plunger carriage is composed of a disc 24 mounted for rotation on an intermediate portion of a plunger lowering handle 25. This handle (Fig. 3) passes through disc 24, and a suitable spacing disc 26 secured to support 20, and is threaded into the support itself.

A primary plunger 28 (Figs. 1–7) is supported in a rugged fitting 32 which is secured in fixed relation to disc 24 (Figs. 1–3) by means of a suitable clamp 27. The fitting 32 is so held in a groove in the base of clamp 27 that the flat wall surface of the plunger is always faced toward the front of the assembly the desired distance above a suitable mold 46.

The mold 46 is definitely located in a selected rotary as well as horizontal position with respect to the assembly and plunger 28 by a V block 45 secured to the table top directly in front of track 12 so that positive assurance is had that a selected outer wall area of the blank produced is in radial alignment with the flat wall of the bore therein.

Arranged 90° around the disc 24, from the clamp 27, a clamp 29 holds a secondary plunger 30, so that by a 90° clockwise rotation of the disc 24 the secondary plunger is brought in the position now occupied by the primary plunger. Rotation of disc 24 is normally prevented by a pin 31 passing through aligned apertures in the discs 24 and 26, but may be withdrawn from the aperture in disc 26 to enable rotation of the disc 24 clockwise 90° to its alternative position, in which it may be held by pushing pin 31 into a second appropriately located aperture in disc 26.

In the primary plunger assembly the upper end of fitting 32 is in the form of a chamber 33 (Fig. 6) in communication with plunger 28 and closed at the top by a bushing 34 containing a fluid discharge tube 35 in communication with the chamber 33. A second tube 36 also enters bushing 33 and is sealed to a smaller tube 37 of usually the same cross-sectional shape as that of plunger 28, and extends downward within plunger 28 to a point near the bottom thereof. The bushing 34 is held tightly clamped to fitting 32 by a suitable flanged coupling 38 threaded to the fitting. The secondary plunger 30 (Figs. 1 and 2) has not been shown in detail as it ordinarily consists of a straight piece of tubing such as 37 (Figs. 1–3) having secured to it a plain fitting 32' similar to the lower half of fitting 32.

Positioned on the face of disc 24 at a point opposite the secondary plunger clamp 29 is a support for a pair of cooling medium control valves 39 and 40 respectively. A cooling medium supply tube 41 has branches connected with one side of valves 39 and 40 while tubes 42 and 43 connect the other side of these valves to tube 36 of the primary plunger assembly and the nearby end of the secondary plunger 30, respectively. A cooling medium supplied to tube 36, under control of the associated valve 39, flows down through tube 37 (Fig. 6) and impinges against the bottom of the plunger 28 and, after filling the space surrounding tube 37 and chamber 33, is discharged through the associated tube 36.

In a similar manner, under control of valve 40, the cooling medium may be supplied to the secondary plunger 30 which, in the form illustrated, allows the cooling medium to flow directly therethrough. It should be understood, however, that if preferred the secondary plunger may take the same form of construction as that of the primary plunger.

It has hereinbefore been mentioned that means is provided for forcing the glass in the mold into intimate contact with the secondary plunger. This means comprises a horseshoe shaped compression block 47 pinned to an intermediate section of a suitable lever 48, one end of which is pivoted to a pipe fitting 49 mounted for horizontal rotation on a standard 50 to enable the lever 48 and the compression block to be rotated in a horizontal plane out of the way of plunger 28 during the preliminary bore forming operation.

In the production of a tubing blank, the mold 46 is placed in position under plunger 28, filled with a charge of molten glass and the plunger forced into the mold by exerting downward pressure on handle 25 until the end of the plunger passes slightly through an aperture 51 in the bottom of the mold and located over an aperture in the table top, valve 39 having been opened to permit the required circulation of a cooling medium through the plunger. As soon as the wall of the bore so formed has been chilled sufficiently to be self-sustaining for a short period of time, the plunger 28 is withdrawn from the mold and the mold temporarily shifted to break off any portion of the glass which may have entered the aperture in the table, thus making certain of there being a bore passing entirely through the blank being formed. The disc 24 is now rotated to its alternative position and plunger 30 lowered into the bore formed by plunger 28 and valve 40 opened to permit the flow of the cooling medium through the plunger 30 to pervent its becoming overheated and to assist in the cooling action of the surrounding glass. At the same time lever 48 is seized and, with compression block 47 in position over the mold, is depressed, thereby forcing the glass therein into intimate contact with the plunger. As soon as the glass has cooled sufficiently to insure that the final bore shape will be retained, the plunger 30 and compression block 47 may be removed.

The subsequent treatment of the blank, such as the attachment of the blank to a punty, the application of contrasting color strips of glass in indentations in the blank caused by protruding sections 52 and 53 in the mold wall, the enlargement of the blank by the usual gathering method, the further marvering of the blank into triangular cross-section, as well as the final drawing of the tubing is carried on in a manner well known, has no bearing on the present invention and therefore is not described herein.

It may be well to bring out, however, that the bore shape of tubing drawn from a blank produced by apparatus such as illustrated by applicant while similar to that disclosed in Fig. 2 of the Palmer et al. patent, differs therefrom in that, as a result of the surface tension which occurs as the tubing is being drawn, the originally flat wall portion of the bore, at its point of junction with the circular wall portion, becomes slightly rounded thereby greatly reducing the liklihood of interference to the flow of liquid by minute particles of foreign matter in the most restricted regions of the bore.

There may be times that it is desirable to line a portion of the bore with a strip of contrasting glass. This may be accomplished by the simple expedient of clamping a ribbon of contrasting glass to either plunger before introducing it into the mold. In either case the large mass of glass in the mold will readily soften the ribbon of contrasting glass and bring about its adhesion to the glass with which it contacts, and the contrasting glass will accordingly remain in the mold when the plunger is withdrawn.

It should be understood that the only reason for using two plungers in the formation of a blank is to obtain a blank with a bore so small that a plunger of its cross section would be too fragile to be depended upon to pierce the mass of molten glass. Therefore, where a blank with a larger size bore is desired, or, when the viscous condition of the glass is such that a smaller plunger may be used to form the bore desired, only one plunger need be used, in which case the method of procedure is similar to that followed when a primary plunger is used. The shifting of the mold to make certain that the bore passes entirely through the blank is, of course, necessary only when the plunger used is open at the bottom as is the plunger 30. It should also be understood that use of the compression block is unnecessary when only one plunger is used.

It will be apparent from the foregoing that I have produced new and useful apparatus by means of which tubing blanks may be made by a new method and the bores of such blanks provided with contrasting strips of glass therein when desired.

I claim:

1. The method of making tubing blanks, which includes producing an enlarged bore in a mass of plastic glass, continuously chilling the wall of such bore for a time period sufficient that it will be temporarily self-sustaining, forcing a reduction of the size of the bore exactly to that desired as the wall of the bore initially formed becomes softened by the heat in the mass of plastic glass surrounding it, and cooling the wall of the reduced size bore so that its shape is permanently retained.

2. In an apparatus for making tubing blanks which includes a mold and a plunger, means for passing the plunger through the mold for a short period of time to form a preliminary bore through the blank, means for cooling the plunger to protect it against overheating and to chill the wall of glass immediately surrounding it while the plunger remains in the mold, a smaller plunger, means for passing it through the bore formed by the first plunger, means for forcing the wall of the first formed bore into intimate contact with the smaller plunger as such wall becomes softened by the surrounding glass, and means for cooling the smaller plunger while in the mold to prevent its becoming overheated and to set the glass as it comes into intimate contact therewith.

3. The method of making a glass tubing blank having a bore partly lined with contrasting glass, which includes simultaneously introducing into a mass of plastic glass a forming plunger and a preformed ribbon of contrasting glass, and subjecting the glass surrounding the plunger to a continuous chilling action until it has become permanently set.

4. In a glass working apparatus a bore forming plunger having a passageway extending longitudinally therethrough, a mold adapted to receive a charge of plastic glass and having a bottom provided with an opening therein, means for lowering said plunger into the mold and on through the bottom opening thereof to form a bore through the charge, and means for passing a cooling medium through the passageway in the plunger.

5. The method of making tubing blanks, which includes producing an enlarged bore in a mass of plastic glass, chilling the wall of such bore for a time period sufficient that the inner layer thereof will temporarily hold its shape, forcing reduction of the bore to the exact size desired after such inner layer has been reheated by the heat in the glass surrounding it and again cooling the wall of the bore while its general shape is retained.

WILLIAM HOWARD SAID.